United States Patent [19]
Ando

[11] Patent Number: 4,656,348
[45] Date of Patent: * Apr. 7, 1987

[54] OPTICAL HEAD

[75] Inventor: Hideo Ando, Tokyo, Japan

[73] Assignee: Kabushiki Kaisha Toshiba, Kawasaki, Japan

[*] Notice: The portion of the term of this patent subsequent to Jun. 4, 2002 has been disclaimed.

[21] Appl. No.: 598,434

[22] Filed: Apr. 9, 1984

[30] Foreign Application Priority Data

Apr. 12, 1983 [JP] Japan ............... 58-64092
Jun. 30, 1983 [JP] Japan ............... 58-119388

[51] Int. Cl.⁴ ............ G01J 1/36; G11B 7/00
[52] U.S. Cl. ................... 250/201; 369/45
[58] Field of Search ........... 250/201 DF, 204, 208, 250/209; 369/44, 45, 46, 111, 112

[56] References Cited

U.S. PATENT DOCUMENTS 4,521,680 6/1985 Ando ............... 250/201

FOREIGN PATENT DOCUMENTS 0070552 1/1983 European Pat. Off. .
0075192 3/1983 European Pat. Off. .

Primary Examiner—Gene Wan
Attorney, Agent, or Firm—Cushman, Darby & Cushman

[57] ABSTRACT

In the optical head, laser beams are converged by the objective lens and projected on the light-receiving surface of the optical disk. The diverged laser beam is reflected by the light-receiving surface, converged by the objective lens into parallel laser beams, and directed to the light shielding plate. Only the laser beam passing through the region spaced from the optical axis is picked up by the light shielding plate, and part of this laser beam is converged by a convergent lens and projected on photo insensitive and first and second photo sensitive regions of the photo detecting unit. The regions of the photo detecting unit are deviated by $\Delta$ from a back focal point of the convergent lens, and the optical axis of the convergent lens passes through one of the first and second photo sensitive regions. The photo insensitive region has a width d which is not more than twice the larger of absolute values $|h3(\Delta, \delta c)|$ and $|h3(\Delta, -\delta C)|$ of variables given as follows:

$$h3(\Delta, \delta c) = \{\mp \Delta/m + 2m\delta c\}(yO/F)$$

$$h3(\Delta, -\delta c) = \{\mp \Delta/m - 2m\delta c\}(yO/F)$$

where $\pm \delta c$ is a maximum defocusing allowance with respect to the convergent point of the objective lens, m is a magnification of the beam spot formed on the regions of the photodector, yO is a radius of an exit pupil of the objective lens, and F is a distance between a principal point of the objective lens and the convergent point of the objective lens.

8 Claims, 20 Drawing Figures

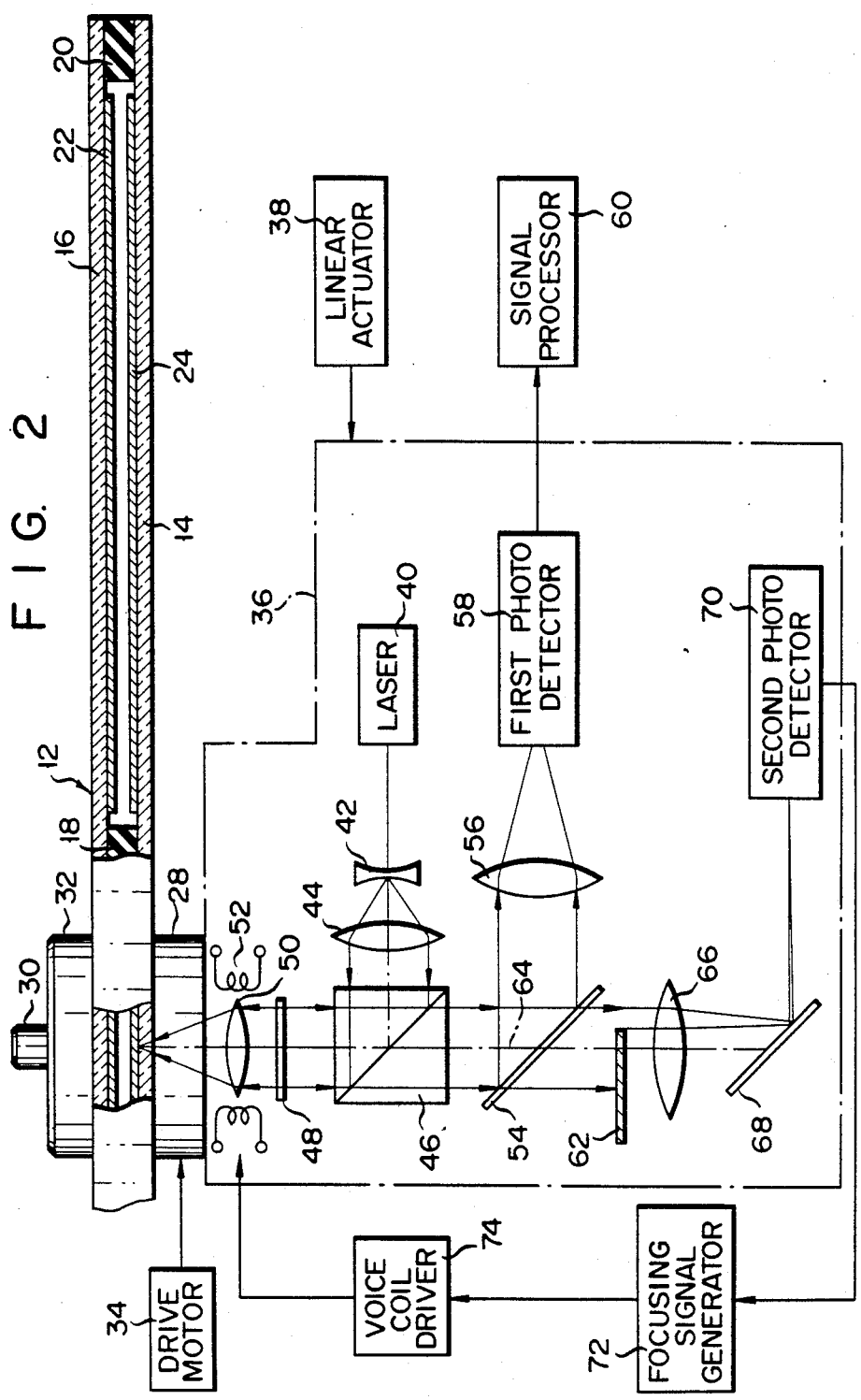

OPTICAL HEAD

BACKGROUND OF THE INVENTION

The present invention relates to an optical head for focusing a light beam for reading an information onto an information recording medium such as an optical disk, and more particularly, to an improvement in a photo detector for an optical head for detecting a defocusing state of a light beam.

Various optical information recording/reproduction systems have been recently devised which optically write and read information on and from an information recording medium (to be referred to as an optical disk hereinafter). For example, information recording/reproduction systems are known which are used for a recording medium for reproduction only such as a CD (compact disk) type of DAD or a video disk, an image file, a still image file, a COM (computer output memory) or the like. In such systems, information is recorded by establishing a state change such as forming a hole (pit) in a recording layer by a focused light beam. In other information recording/reproduction systems, information is optically written on or read from an information recording medium for recording/reproduction or from an erasable information recording medium (to be referred to as an optical disk hereinafter). In these systems, in both the write and read modes, a light beam must always be focused on the optical disk. In view of this requirement, the optical head frequently has a focus detecting system for detecting the state of focus of the light beam. Various such focus detecting systems have been proposed. For example, U.S. Pat. No. 4,521,680 issued June 4, 1985 and corresponding EPC application No. 82106508.3, filed on July 19, 1982 disclose a focus detecting system adopting the so-called knife edge method.

In this focus detecting system adopting the knife edge method, as shown in FIG. 1, a laser beam is reflected from a recording layer or light reflecting layer 10 on which information is to be or is already recorded. An objective lens 2, a knife edge 4, a convergent lens 6 and a photo detecting unit 8 are arranged on an optical path 0—0 of the reflected light from the recording layer 10. The knife edge 4 serves to allow passage of only that laser beam component which is spaced apart from the optical axis 0—0. The photo detecting unit 8 detects a laser beam which is converged by the convergent lens 6. The photo detecting unit 8 has a photo insensitive region 9 and two, first and second, photo sensing regions or photo sensitive regions 8-1 and 8-2 which is separated by the photo insensitive region 9, and is located at the back focal point of the convergent lens 6. In such a focus detecting system, the defocusing state is not detected by a change in the beam spot size on the photo detecting unit 8 but is detected by a deviation in the beam spot position in a direction 10. In the just in-focusing state, the beam spot is formed at the boundary between the two photo sensitive regions 8-1 and 8-2 of the photo detecting unit 8. A differential signal of the two photo signals from these regions 8-1 and 8-2 is kept substantially zero. In contrast to this, when the objective lens 2 draws too near to the recording layer 11 or is spaced too far apart therefrom, resulting in the defocusing state, the differential signal of the signals from the first and second photo sensitive regions 8-1 and 8-2 changes in the positive or negative direction.

In the focus detecting system described above, the photo sensitive regions 8-1 and 8-2 are separated by the photo insensitive region 9. However, when a width (distance between the photo sensitive regions 8-1 and 8-2) of the photo insensitive region 9 is excessively great, no defocusing signal will be generated from the photo detecting unit 8 even when the objective lens 2 is defocused and a beam spot is formed in the photo insensitive region 9 of the photo detecting unit 8. Conventionally, the width of the photo insensitive region 9 falls within a predetermined range, but sufficient consideration has not been given to the width of the photo insensitive region 9. In order to cause the photo detecting unit 8 to detect a defocusing state with satisfactory sensitivity, the width of the photo insensitive region 9 must fall within a predetermined range.

SUMMARY OF THE INVENTION

It is an object of the present invention to provide an optical head which is capable of detecting a state of focus with high reliability and sensitivity.

According to the present invention, there is provided an optical head for focusing light beam on a light-reflecting surface comprising means for generating a light beam, means for transferring the light beam, an objective lens which converts the transferred light beam into a convergent light beam with a beam waist, projects the light beam on the light-reflecting surface and converges the divergent light beams reflected from the light-reflecting surface, said objective lens having a congergent point and an inherent maximum defocusing allowance $\pm\delta c$ with reference to the convergent point, means for deflecting the light beam directing from the objective lens, depending on the distance between the objective lens and the light-reflecting surface, means for converging the light beam into a convergent point corresponding to the beam waist image formed at a focusing state, and a photodetector having first and second photo sensitive regions and a photo insensitive region defined therebetween, a part of a beam spot being formed on one of the photosensitive regions by the light beam projected on the photodetector when the objective lens is defocused over the maximum defocusing allowance $\pm\delta c$.

BRIEF DESCRIPTION OF THE DRAWINGS

FIG. 2 is a block diagram of an optical system in which the optical head of the present invention is assembled;

DETAILED DESCRIPTION OF THE PREFERRED EMBODIMENTS

Figure 1:
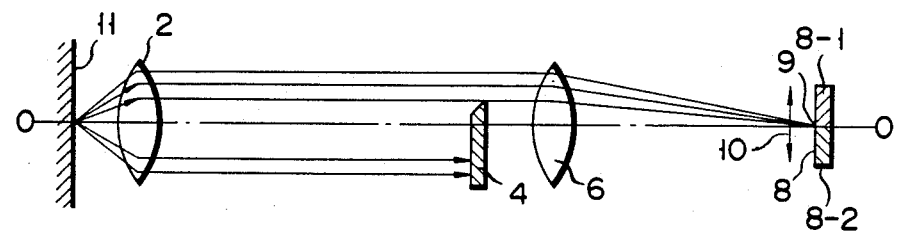
FIG. 1 shows an optical system of a conventional optical head adopting the knife edge method.

An optical system for recording and reproducing information using an optical head of the present invention will now be described with reference to FIG. 2. An optical disk 12 is obtained by adhering together a pair of disk-shaped transparent plates 14 and 16 through inner and outer spacers 18 and 20. Information recording layers or light reflecting layers 22 and 24 are formed by deposition on the inner surfaces of the respective transparent plates 14 and 16. Tracking guides 26 are formed helically or concentrically on each of the light reflecting layers 22 and 24. Information is recorded on these tracking guides 26 in the form of pits. A hole is formed at the center of the optical disk 12. When the optical disk is placed on a turntable 28, a center spindle 30 of the turntable 28 extends through this central hole of the optical disk 12, so that the centers of rotation of the turntable 28 and the optical disk 12 are aligned. A chuck device 32 is mounted on the center spindle 30 of the turntable 28 and fixes the optical disk 12 on the turntable 28. The turntable 28 is rotatably supported on a support base (not shown), and is driven at a constant speed by a drive motor 34.

An optical head 36 is arranged to be movable in the radial direction of the optical disk 2 by means of a linear actuator 38 or a rotary arm. A laser 40 for generating a laser beam is arranged inside the optical head 36. When information is to be written on the optical disk 12, the laser 40 generates a laser beam which has an intensity modulated in accordance with such information. When the recorded information is to be read from the optical disk 12, a laser beam having a constant intensity is generated from the laser 40. The laser beam from the laser 40 is diverged by a concave lens 42, collimated by a convex or collimator lens 44 into parallel light rays, and directed toward a polarization beam splitter 46. The parallel laser beams reflected by the polarization beam splitter 46 become incident on an objective lens 50 through a ¼ wave plate 48 and are converged toward the light reflecting layer 24 of the optical disk 12 by the objective lens 50. The objective lens 50 is supported by a voice coil 52 to be movable along the optical axis. When the objective lens 50 is located at a predetermined position, the beam waist of the converging laser beam from the objective lens 50 is projected onto the surface of the light reflecting layer 24 to form a minimum-sized spot on the surface of the light reflecting layer 24. In this state, the objective lens 50 is kept in the just in-focusing state to allow read and write of information. When information is written, pits are formed on the tracking guides or preformed grooves 26 on the light reflecting layer 24 by an intensity-modulated laser beam. When information is read out, a laser beam having a constant intensity is intensity-modulated by the pits formed in the tracking guides 26 and is reflected thereby.

The divergent laser beam reflected from the light reflecting layer 24 of the optical disk 12 is converted into parallel light rays by the objective lens 50 and returned to the polarization beam splitter 46 through the ¼ wave plate 48. When the laser beam is returned back through the ¼ wave plate 48, the polarization plane is rotated through 90° as compared to that when the laser beam is reflected by the polarization beam splitter 46. This returned laser beam whose polarization plane is rotated through 90° is not reflected by the polarization beam splitter 46 and passes therethrough. The laser beam emerging from the polarization beam splitter is split by a half mirror 62. One part of the split beam is irradiated onto a first photo detecting unit 58 through a convex lens 56. A first signal from the first photo detecting unit 58, containing information recorded on the optical disk 12, is supplied to a signal processor 60, and is converted into digital data. The other part of the split beam from the half mirror 54 is subjected to extraction by a light shielding plate or a knife edge 62 to extract only a component passing through a region spaced apart from an optical axis 64. The extracted component is passed through a projection lens 66 and becomes incident on a second photo detecting unit 70. The light shielding plate 52 may be replaced by a prism, an aperture or a slit. A signal from the second photo detecting unit 70 is processed by a focusing signal generator 72. A focusing signal from the focusing signal generator 72 is supplied to a voice coil drive circuit 74. In response to the focusing signal, the voice coil drive circuit 74 drives the voice coil 52 and keeps the objective lens 50 in the just in-focusing state. When the tracking guides 26 formed on the light reflecting layer 24 of the optical disk 12 are to be correctly traced, a signal from the first photo detecting unit 58 can be processed to actuate the linear actuator 38. Alternatively, the objective lens 50 can be moved in the transverse direction or a galvano mirror (not shown) can be used.

Figure 4A:
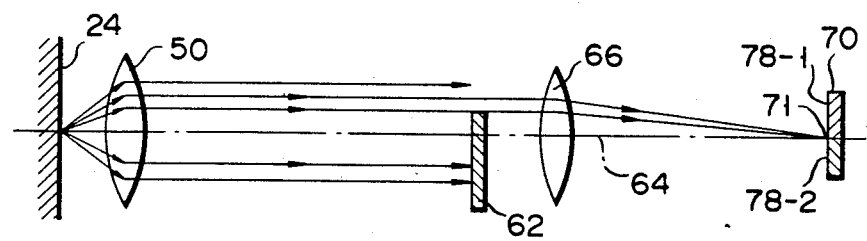
FIGS. 4A to 4C show a path of a laser beam in the optical system shown in FIG. 3 in the just in-focusing state and in various defocusing states.
Figure 4B:
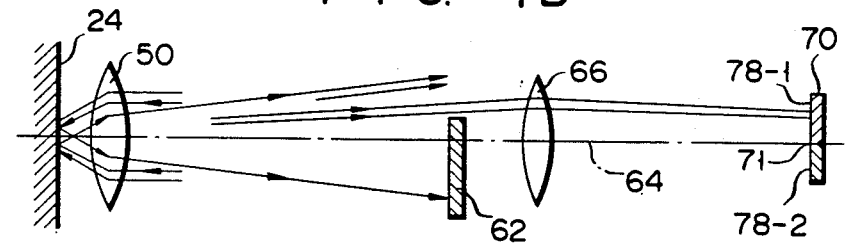
Figure 4C:
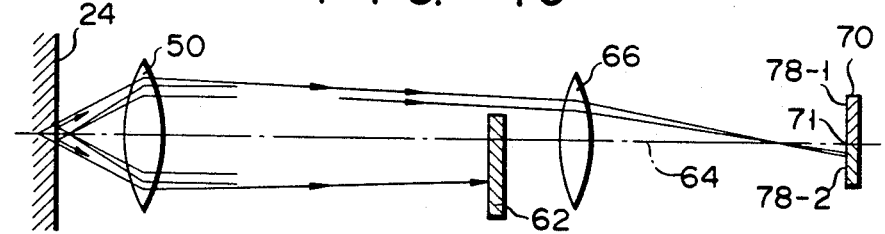
Figure 3:
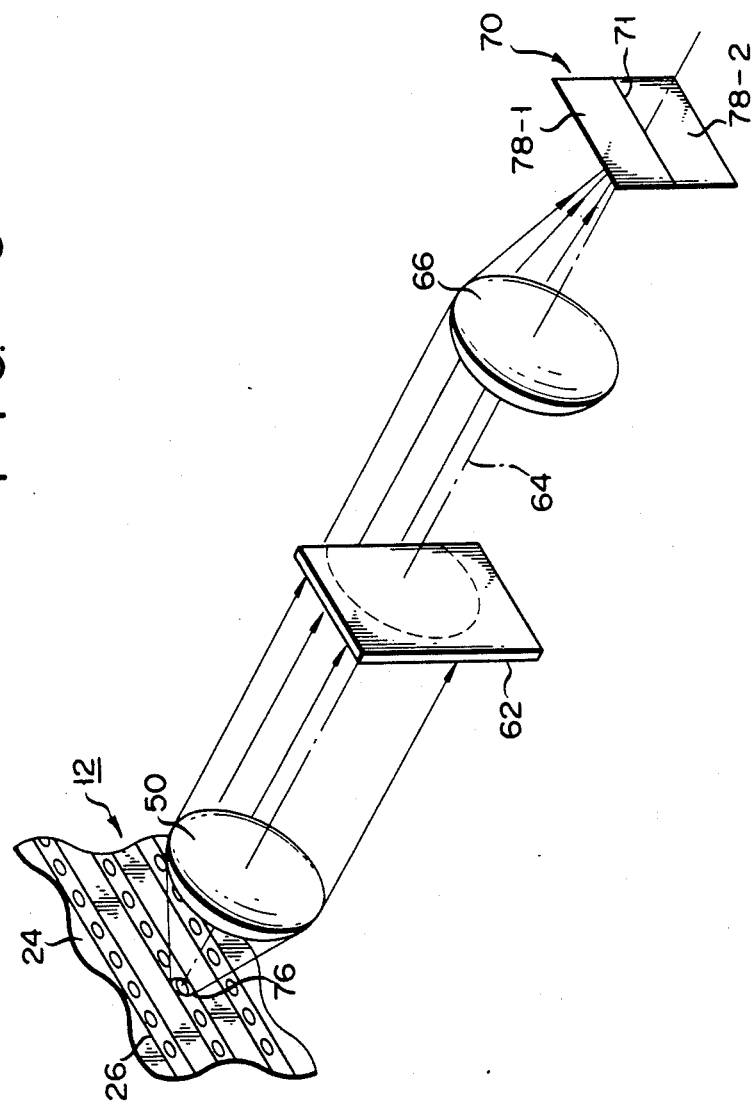
FIG. 3 is a simplified view of the optical system of the optical head shown in FIG. 2.
Figure 5A:
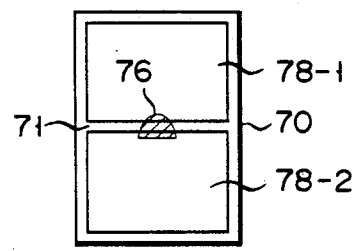
FIGS. 5A to 5D show the beam spot images or patterns which are formed on photo sensitive regions of a photo detecting unit shown in FIGS. 4A to 4D.
Figure 5B:
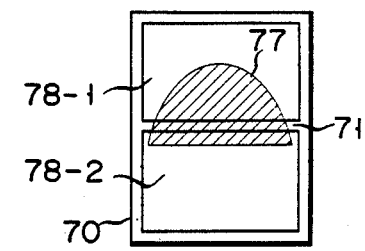

The optical system for detecting the just in-focusing state shown in FIG. 2 is shown simplified in FIG. 3. The path of the laser beam associated with the just in-focusing state and with various defocusing states is drawn as shown in FIGS. 4A to 4C. When the objective lens 50 is in the just in-focusing state, the beam waist is projected onto the light reflecting layer 24. A minimum-sized beam spot, i.e., the beam waist spot 76 or a spot slightly larger than this spot, is formed on the light reflecting layer 24. Since the laser beam which becomes incident on the objective lens 50 from the laser unit 40 consists of parallel rays, the beam waist is formed at the focal point of the objective lens 50. However, if the laser beam incident on the objective lens 50 from the laser 40 is slightly divergent or convergent, the beam waist is formed in the vicinity of the focal point of the objective lens 50. In the optical system shown in FIGS. 2, 3, and 4A to 5A, photo sensitive regions 78-1 and 78-2 and a photo insensitive region 71 of a photo detecting unit 70 are on or only slightly deviated from the image forming plane of the beam waist spot image 76 in the just in-focusing state. Therefore, in the just in-focusing state, the beam waist spot image or pattern 76 is formed on the photo insensitive region 71 between the photo sensitive regions 78-1 and 78-2 of the photo detecting unit 70, as shown in FIG. 5A. Thus, as shown in FIG.

Figure 5C:
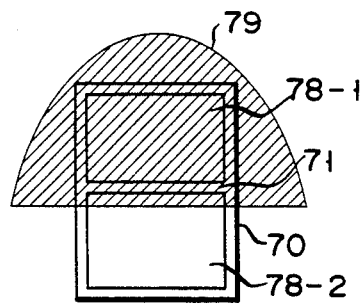

4A, the beam waist spot is formed on the light reflecting layer 24. The laser beam reflected by the light reflecting layer 24 is converted into parallel light rays by the objective lens 50, and the parallel light rays are directed to the light shielding plate 62. The light component passing through a region spaced apart from the optical axis 64 is extracted by the light shielding plate 62, focused by the projection lens 66, and focused to a minimum diameter on the photo detecting unit 70. Thus, as shown in FIG. 5A, the beam waist spot image or pattern 76 is formed on the photo detecting unit 70. At this time, the levels of the signals from the photo sensitive regions 78-1 and 78-2 of the photo detecting unit 70 are kept to be substantially the same. When the objective lens 50 draws closer to the light reflecting layer 24, the beam waist is formed after reflection of the laser beam by the light reflecting layer 24, as shown in FIG. 4B. Thus, the beam waist is formed between the objective lens 50 and the light reflecting layer 24. In this defocusing state, the beam waist is generally formed within the focal length of the objective lens 50. As may be apparent, assuming that the beam waist serves as a light spot, a laser beam reflected by the light reflecting layer 24 and emerging from the objective lens 50 is converted into a divergent laser beam by the objective lens 50. Since the laser beam component extracted by the light shielding plate 62 is also divergent, even after being converged by the projection lens 66 it is not focused to a minimum size on the regions 71, 78-1 and 78-2 of the photo detecting unit 70, but is focused at a point further away than the photo detecting unit 70. Accordingly, such a laser beam component is projected onto the photo detecting unit 70 in a region above the optical axis 64. A beam spot image or pattern 77 larger than the beam waist spot image 76 is formed on the regions 71, 78-1, 78-2. A signal from the first photo sensitive region 78-1 becomes lower in level than that from the second photo sensitive region 78-2. A differential signal of the two signals is generated by the focusing signal generator 72 as a focusing signal. When the objective lens 50 draws even closer to the light reflecting layer 24, a larger beam spot image or pattern 79 is formed extending beyond the first photo sensitive region 78-1, as shown in FIG. 5C.

Figure 5D:
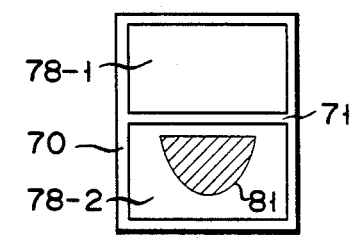

When the objective lens 50 is spaced further apart from the light reflecting layer 24, as shown in FIG. 4C, the laser beam is reflected by the light reflecting layer 24 after forming a beam waist. In such a defocusing state, the focal length of the objective lens 50 generally lies beyond the beam waist which is formed between the objective lens 50 and the light reflecting layer 24. The reflected laser beam directed toward the light shielding plate 62 from the objective lens 50 is thus convergent. The laser beam extracted by the light shielding plate 62 is further converged by the projection lens 66 and is projected onto the regions 71, 78-1 and 78-2 of the photo detecting unit 70 after forming a beam waist spot. As a result, a pattern 81 smaller than the beam waist spot image is formed in the lower portion of the regions 71, 78-1 and 78-2 of the photo detecting unit 70, as shown in FIG. 5D.

Figure 6:
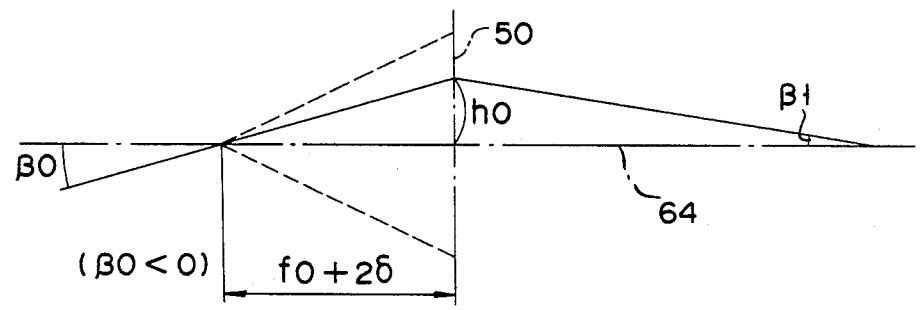
FIG. 6 is a view showing the geometric path of light from a light source passing through the objective lens shown in FIG. 3.

A change in the path of the laser beam can be explained geometrically/optically as follows. A deviation h2 of the laser beam component on the photo detecting unit 70 from the optical axis can be determined. The geometric/optical imaging system of the objective lens 50 is as illustrated in FIG. 6. Referring to FIG. 6, f0 represents the focal length of the objective lens 40 and δ represents the displacement of the objective lens 50, that is, a change in the distance thereof from the light reflecting layer 24 of the optical disk 12 when a change from the just in-focusing state to the defocusing state is made. In FIG. 6, the laser beam path indicated by the solid line emerges from the beam waist, passes through a point on the principle plane of the objective lens 50 which is a distance h0 away from the optical axis 64, and is focused. In the just in-focusing state shown in FIG. 4A, δ=0. In the defocusing state shown in FIG. 4B, the objective lens 50 draws closer to the optical disk 12 by the displacement distance δ. Since the beam waist is formed by the laser beam reflected from the light reflecting layer 24, the beam waist comes closer to the objective lens 50 by double the displacement distance δ (in this case, δ<0). In the defocusing state shown in FIG. 5C, the objective lens 50 is spaced further apart from the optical disk 12 by the displacement distance δ, and the laser beam is reflected from the light reflecting layer 24 after the beam waist is formed. Accordingly, this is basically similar to the state wherein the beam waist is formed behind the light reflecting layer 24. Thus, the beam waist is spaced apart from the objective lens by the distance 2δ. In the just in-focusing state, if the beam waist is formed at the focal point of the objective lens 50 and the objective lens 50 is then moved further apart from the optical disk 12 by the distance δ, the distance between the beam waist and the principle plane of the objective lens 50 is represented by (f0+2δ). When the beam waist is regarded as a point, angles β0 and β1 shown in FIG. 6 are given by equations (1) and (2) below:

$$h0/(f0+2\delta)=\tan(-\beta 0)\approx \beta 0 \qquad (1)$$

From the lens imaging theorem, $$\tan(-\beta 0)/h0+\tan\beta 1/h0=1/f0$$

Therefore, $$\beta 1 = \beta 0 + h0/f0 \qquad (2)$$
$$= h0/(f0 + f0^2/2\delta)$$

Figure 7:
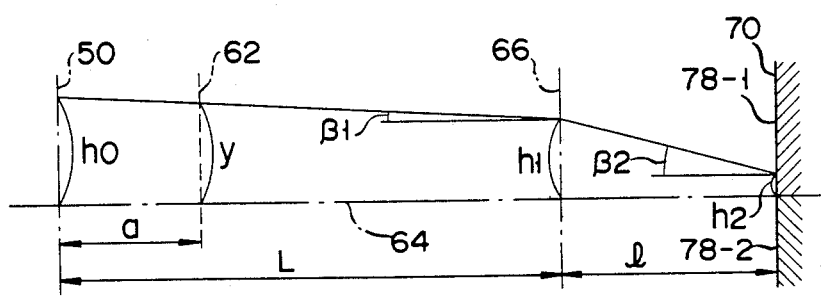
FIG. 7 is a view showing the geometric path of light from a light source passing through a projection lens system shown in FIG. 3.

FIG. 7 shows the geometric path of light in the optical system of the projection lens 66. It is also assumed that the respective lens 66 have focal length f1, the light shielding plate 62 is arranged at a distance a from the principal plane of the objective lens 50, the principal plane of the lens 66-1 is arranged at a distance L from that of the objective lens 50, the principal plane of the lens 66 is arranged at a distance l from the regions 71, 78-1 and 78-2 of the photo detecting unit 70. The path indicated by the solid line is the path of light rays which are converged by the objective lens 50 and which then pass through the light-transmitting plane of the light shielding plate 62 the edge of which is apart from the optical axis at a distance y.

The distance y is given by equation (3) below:

$$y = h0 - a\beta 1 \qquad (3)$$
$$= h0\{1 - a \cdot 1/(f0 + f0^2/2\delta)\}$$

If we assume $F(\delta)=(f0+f0^2/2\delta)^{-1}$, equation (3) can be rewritten as:

$$y=h0(1-aF(\delta)) \qquad (4)$$

Therefore, $$h0 = y/(1 - aF(\delta)) \quad (5)$$

A distance h1 of the path of the transmitted light component from the optical axis 64 at the principal plane of the lens 66 is given by equation (6) below:

$$h1 = y - (L - a)\beta 1 \quad (6)$$
$$= \{(1 - LF(\delta))/(1 - aF(\delta))\} \cdot y$$

Angle $\beta 2$ can be calculated in a similar manner as in the case of angle $\beta 1$ in equation (2) as follows:

$$\beta 2 = \beta 1 + h1/f1 \quad (7)$$
$$= \{y/(1 - aF(\delta))\}\{1/f1 + (1 - L/f1)F(\delta)\}$$

The distance or deviation h2 from the optical axis 64 of the transmitted light component at the photo region of the photo detecting unit 70 is given by equations (8) to (10) below:

$$h2 = h1 - H\beta 2 \quad (8)$$
$$= \{y/(1 - aF(\delta))\}\{(1 - l/f1) - [l + L(1 - l/f1)] \times F(\delta)\}$$

When $l = f$, equation (8) can be rewritten as:

$$h_2 = \frac{-y \cdot f_1 \cdot F(\delta)}{1 - aF(\delta)} \quad (9)$$
$$= \frac{\mp m f_0 y}{(a - f_0) - f_0^2/2\delta}$$

Note that m is a transverse magnification factor and is obtained from $\pm m = -\beta 0/\beta 2$. Thus, $+m$ represents the case of inverted image, and $-m$ represents the case of an erect image.

In the optical system shown in FIG. 6, it is assumed that the beam waist is formed at the focal point of the objective lens 50. However, when a divergent or convergent laser beam is incident on the objective lens 50, the position of the beam waist is deviated from the focal point of the objective lens 50 by a distance b.

Figure 8:
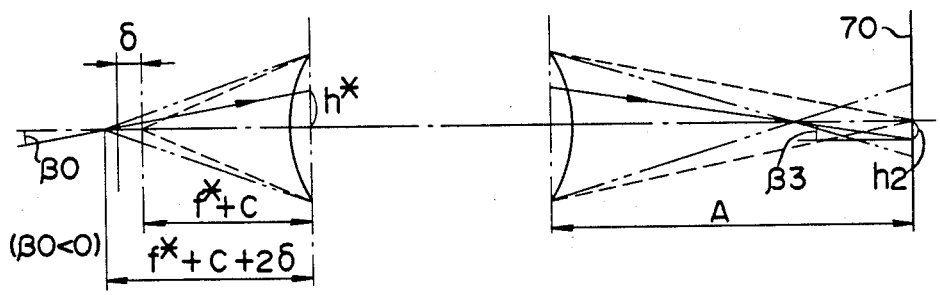
FIG. 8 is a view showing the geometric path of light when the lenses shown in FIGS. 6 and 7 are replaced with a single synthetic lens.

When it is assumed that the lens system for processing the light which is reflected by the light reflecting layer 24 of the optical disk 12 and reaches the photo detecting unit 70 through the objective lens 50 and the projection lens 66 is a single compound lens, the calculation to be described below can be performed in place of the calculation described above. That is, the optical path of the reflected light obtained when the beam waist position is deviated from the focal point of the objective lens 50 by the distance $\delta$ is calculated in accordance with equations up to equation (9), assuming that the focal length of the single compound lens is f* and the distance from the front focal point of the single compound lens to the optical disk 12 when the just in-focusing state is established (focused laser beam) is C. When the projection lens 66, a detection lens 73, and the like are all considered as a single synthetic lens, we have from FIG. 8:

$$h^*/(f^* + C + 2\delta) = \tan(-\beta 0) \approx -\beta 0$$

Thus, $$h^* = -\beta 0 \cdot (f^* + C + 2\delta) \quad (10)$$

Also, $$\beta 2 = \beta 0 + h^*/f^* = \{\beta 0 - \beta 0 - (C + 2\delta)\beta 0/f^*\} \quad (11)$$
$$= -\beta 0 (C + 2\delta)/f^*$$

When the second photo detecting unit 70 is arranged at the image forming plane when the focused point of the laser beam and the position of the light reflecting layer 24 of the optical disk 12 coincide with each other (when $\delta = 0$), we have h2 = 0. The transverse magnification factor m at this time is obtained from $\pm m = -\beta 0/\beta 2$ to be $m = \pm f^*/C$.

Therefore, $$C = \pm f^*/m \quad (12)$$

Note that m is assumed to be always a positive number. Thus, $+m$ represents the case of an inverted image, and $-m$ represents the case of an erect image.

When the distance from the rear principal point of the compound lens to the second photo detecting unit 70 is represented by A, we have:

$$h2 = h^* - A\beta 2 \quad (13)$$
$$= \beta 0\{(\pm A/m - f^* \mp f^*/m) + (A/f^* - 1) \times 2\delta\}$$

For any value of $\beta 0$ and for $\delta = 0$, from h2 = 0, we have:

$$A = f^*(1 \pm m) \quad (14)$$

Substitution of equation (14) in equation (13) provides:

$$h2 = \beta 0\{f(1 \pm m)/f^* - 1\} \times 2\delta \quad (15)$$
$$= \pm 2m\delta \times \beta 0$$

Substitution of equations (1) and (5) in equation (15), following equations (16) and (17) are established.

$$h2 = \mp m f 0 y/(a - f 0 - f 0^2/2\delta) \quad (16)$$

$$h2 = \pm (2my/f0)\delta \quad (17)$$

Figure 9:
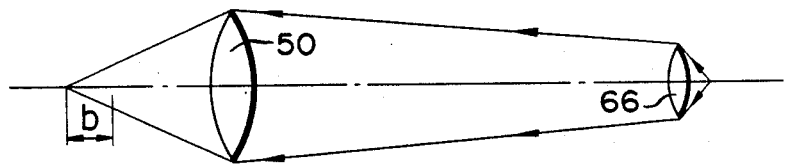
FIG. 9 is a diagram showing the path of the light when the beam spot or waist is not formed at the focal point of the objective lens but at a position deviated slightly therefrom.

As shown in FIG. 9, when laser beam incident on the objective lens 50 is convergent or divergent, and the focused point of the laser beam is deviated from the focal point of the objective lens 50 by the distance b, conversion in equations (1) to (9) of:

$$2\delta \rightarrow 2\delta + b$$

allows establishment of the proper equations. Accordingly, from equation (5), we have:

$$h0 = \{[f0 + f0^2/(2\delta + b)]/[f0 + f0^2/(2\delta + b) - a]\} \times y \quad (18)$$

Substitution of equation (18) in equation (1) yields:

$$\beta 0 = -h0/(f0 + 2\delta + b) \quad (19)$$
$$= -[f0 \cdot h0/(2\delta + b)]/[f0 + f0^2/(2\delta + b)]$$
$$= f0 \cdot y/\{(2\delta + b)/[f0 + f0^2/(2\delta + b) - a]\}$$
$$= -f0 \cdot y/\{f0^2 + (f0 - a)(2\delta + b)\}$$

-continued $$= -y/\{f0 + (1 - a/f0)(2\delta + b)\}$$

Substitution of equation (12) in equation (15) provides:

$$h2 = \mp 2my\delta/\{f0 + (1 - a/f0)(2\delta + b)\} \qquad (20)$$

If $a = 0$, $$h2 = \mp 2my\delta/(f0 + b + 2\delta) \qquad (21)$$

If $f0 + b \gg 2\delta$, $$h2 \approx \mp 2my\delta/(f0 + b) \qquad (22)$$

Equations (9), (10), (13), (15), (16) and (17) indicate that when the focal point of the objective lens 50 is deviated from the light reflecting layer 24 of the optical disk 12 by the distance $\delta$, the beam spot formed on the photo sensitive regions 78-1 and 78-2 of the photo detecting unit 70 is geometrically deviated from the optical axis 64 for the distance h2.

Figure 10:
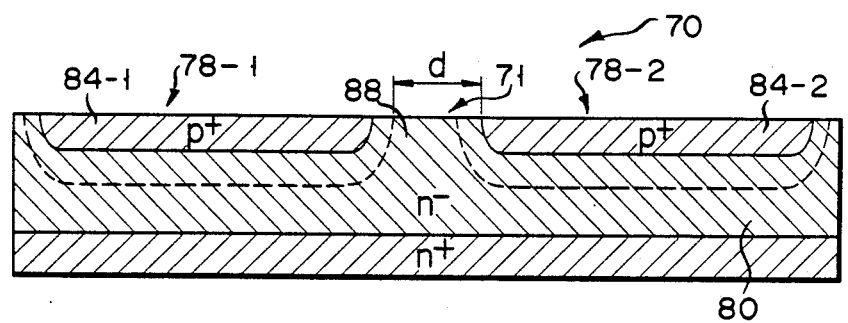
FIG. 10 is a schematical cross sectional view of the photo detecting unit.

The structure of the photo detecting unit 70 will be described with reference to FIG. 10. The photo detecting unit 70 comprises a high-speed PIN diode. In this photo detecting unit, an $n^+$-type layer 82 is formed on one major surface of an $n^-$-type substrate 80 having a low impurity concentration. $P^+$-type layers 84-1 and 84-2 are respectively formed as the photo sensitive regions 78-1 and 78-2 on the other major surface of the $n^-$-type substrate 80. A portion 88 of the $n^-$-type substrate 80 is defined as the photo insensitive region 71. Regions indicated by dotted lines in FIG. 10 are depletion regions 86-1 and 86-2 formed between the $p^+$-type layer 84-1 and an $n^+$-type layer 82 and between the $p^+$-type layer 84-2 and the $n^+$-type layer 82, respectively.

When light rays are incident on the surface of the photo detecting unit 70 having the structure described above, hole-electron pairs are formed in the photo detecting unit 70. When the hole-electron pairs are formed in the depletion regions 86-1 and 86-2, electrons are drawn to the $p^+$-type layers 84-1 and 84-2, and holes are drawn to the $n^-$-type substrate 80 to generate a detection signal. However, most of the hole-electron pairs generated in the region in the $n^-$-type substrate 80 are recombined to achieve an electrically neutral state. Only a few hole-electron pairs are diffused to reach the depletion regions 86-1 and 86-2, thereby obtaining a detection signal. Light rays which have reached the portion 88 through the photo insensitive region 71 generate hole-electron pairs. However, most of the hole-electron pairs are recombined before they reach the depletion regions 86-1 and 86-2 and cause generation of a detection signal. Therefore, the photo insensitive region 71 is given to be a region having poor photo detection sensitivity. When a distance (i.e., a width d of the region 71) between the $p^+$-type layers 84-1 and 84-2 is sufficiently great, most of the hole-electron pairs generated upon radiation of light rays onto the central portion of the region 71 disappear before they reach the regions of the depletion regions 86-1 and 86-2. An aluminum layer may be formed on the photo insensitive region 71 to shield the laser beam. An $n^+$-type layer may be formed on the portion 88 to prevent generation of the hole-electron pairs.

The width d of the photo insensitive region 71 will be considered. As is apparent from the above description, the photo insensitive region 71 is defined as a region which substantially fails to detect light rays. When the width of this region exceeds a predetermined range, the optical head fails to detect the just in-focusing state with satisfactory sensitivity. A maximum value of the width d of the photo insensitive region 71 is determined by an edge position (i.e., deviation h2 of the laser beam component) of a minimum beam spot pattern formed on the photo detecting unit 70 which must be detected. In other words, the edge position of the beam spot pattern is obtained by substituting 0, y0 and F for a, y and f0+b, respectively, in equation (20) and is given as follows:

$$h2 = \mp \{2my0\delta/(F + 2\delta)\}\delta \qquad (23)$$

where y0 is the radius of the exit pupil of the objective lens 2 or the radius of the aperture thereof, and F is the distance between the principal point of the objective lens 2 and the focal point thereof (i.e., beam waist position), that is, between the objective lens 2 and the light reflecting layer 24. When a maximum defocusing allowance in equation (23) is $\pm\delta c$, the beam spot pattern can be formed in the photo insensitive region 71. Therefore, the photo insensitive region 71 must have a width d defined by the following relation:

$$d \leq |h2(+\delta c)| + |h2(-\delta c)| \qquad (24)$$
$$= |\mp 2my0\delta c/(F + 2\delta c)| + |\pm 2my\delta c/(F - 2\delta c)|$$
$$\approx |\{2my0/(f + 2\delta c)\}\delta c|$$

Since $2\delta c$ is much smaller than F, the width d is thus given by:

$$d \leq 4my0\delta c/F \text{ for } 2\delta c \ll F$$

A maximum defocusing allowance beyond which the defocusing amount $\delta c$ need not be detected will be discussed. When the laser beam having a uniform light intensity is projected on the objective lens 50 and is converged on the light reflecting layer 24 of the optical disk 12, this convergent point has a light intensity distribution which is given to be the Airy disk pattern represented by the Bessel function. This pattern has a diameter $al = 0.82\lambda/NA$ which provides an intensity of $1/e^2$ when the central light intensity is given as 1, as is represented by equation (25), where NA is the numerical aperture of the objective lens and $\lambda$ is the wavelength of the laser beam.

A light intensity at the optical axis on a plane which is spaced by a distance Z from the convergent point is known to be given by:

$$I(Z) = I0\{\text{sin-c}[(\pi/2)(NA \cdot Z/\lambda)]\}^2 \qquad (25)$$

A distance $\Delta Z$ between the convergent point and a given position at which the central light intensity is 80% of the central light intensity at the convergent point is generally defined as a focal depth and given as follows:

$$\Delta Z = \pm \lambda/2(NA)^2 \qquad (26)$$

In the optical head, pits are formed in the light reflecting layer 24 in accordance with the laser beam with a high light intensity or power, thereby recording information in the optical disk 12. The present inventor finds that the maximum allowance for the defocusing amount δc is substantially the same as the focal depth. Accordingly, following equation is established.

$$\delta c = \pm \lambda/2(NA)^2 \quad (27)$$

The same consideration as described above can be applied when a laser beam which does not have a uniform light intensity distribution but has the Gauss distribution is projected on the objective lens 50. In other words, a spot radius ω0 at the convergent point is given as follows:

$$\omega 0 \approx (2/\pi)(\lambda/NA) \quad (28)$$

A radius ω(Z) of the beam spot which is spaced apart from the convergent point by the distance Z is given by:

$$\omega(Z) = \omega O \sqrt{1 + (\lambda Z/\pi \omega O^2)^2} \quad (29)$$

The focal depth ΔZ is given as follows and corresponds to the maximum defocusing allowance δc:

$$\Delta Z = \delta c = \pm \lambda/\pi(NA)^2 \quad (30)$$

The defocusing amount δc is considered from another viewpoint. When the light reflecting layer (recording layer) 24 of the optical disk 12 is subjected to a state change such as formation of pits, it is very difficult to perform recording when defocusing occurs to increase the spot size and the central light intensity of the spot decreases. A spot size al on the light reflecting layer 24 in the just in-focusing state is given by $al = 0.82\lambda/NA$. In this case, if the intensity distribution resembles the Gauss distribution, the radius ω(Z) of the spot on the light reflecting layer 24 in the defocusing state is given by equation (31):

$$\omega^2(Z) = \{\omega 0^2 \, 1 + (\lambda Z/\pi \omega 0^2)^2\} \quad (31)$$
$$= \{\omega 0^2 \, 1 + ((NA)^2/0.17\pi\lambda)^2 \cdot Z^2\}$$

In this case, the central light intensity of the spot is decreased as follows:

$$I = \{\omega 0/\omega(Z)\}^2 \quad (32)$$

When a minimum central light intensity of the spot which allows recording is given to be Imin, $$Imin \leq \{1 + ([NA]^2/0.17\pi\lambda)^2 \cdot Z^2\}^{-1} \quad (33)$$

Therefore, $$1 + ([NA]^2/0.17\pi\lambda)^2 \cdot Z^2 \leq 1/Imin \quad (34)$$
$$([NA]^2/0.17\pi\lambda)^2 Z^2 \leq -1/Imin - 1$$

$$|\delta c| = |Z| \leq \{0.17\pi\lambda/(NA)^2\} \sqrt{1/Imin - 1}$$

Now assume that λa=0.83 μm, NA=0.6 and Imin=0.7. The above inequality can be rewritten as follows:

$$|\delta c| = |Z| \leq (0.44/0.36) \sqrt{0.4286} = 0.81 \, \mu m$$

On the other hand, when it is assumed that λ=0.83 μm, NA=0.5 and Imin=0.7, $$|Z| \leq (0.44 \times 0.36)/0.25 = 1.16 \, \mu m$$

The defocusing allowance δc falls within the range of 0.5 to 2.0 μm.

An optical head according to a modification of this embodiment will now be described. In order to prevent an influence of diffraction of light, the regions 78-1, 78-2 and 71 of the photo detecting unit 70 are preferably located to be slightly deviated from the image forming plane (i.e., back focal plane of the projection lens 66) in the just in-focusing state of the optical system, as shown in FIGS. 11A to 11C.

Reference numeral 70A denotes a photo detecting unit which is located at a position between the projection lens 66 and the focal point thereof, and reference numeral 70B denotes a photo detecting unit which is located at a position further than the focal point of the projection lens 66. When a slight defocusing occurs, a semicircular spot portion is formed on the photo detecting unit 70 arranged at the image forming plane. This semicircular spot portion is detected by one photo sensitive region to detect the defocusing. However, in just in-focusing state, this semicircular spot portion has a spot size of 0.82 mλ/R·NA due to the influence of the diffraction of light. For this reason, detection sensitivity is degraded near the just in-focusing state. This phenomenon may be explained as follows.

Figure 12:
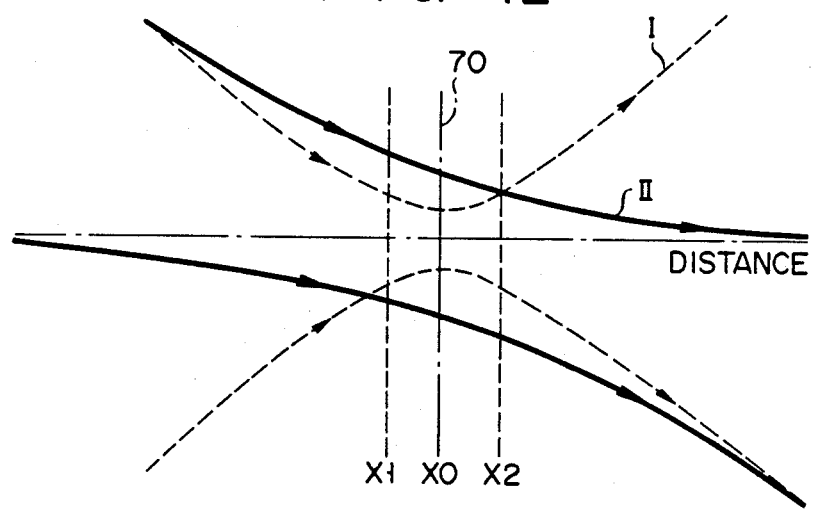
FIG. 12 shows the path of a laser beam passing through the image forming plane.
Figure 11A:
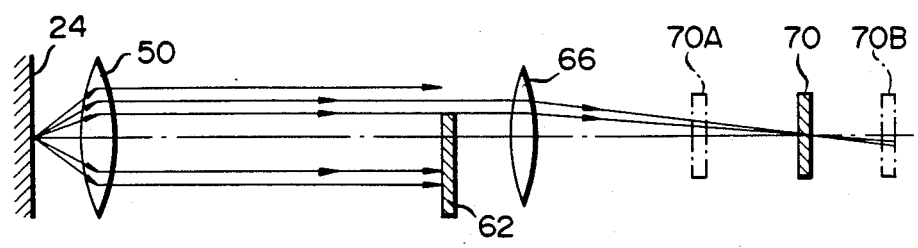
FIGS. 11A to 11C are views showing the paths of light beams according to another embodiment of the present invention when the photo detecting unit is not located on the image forming plane.
Figure 11B:
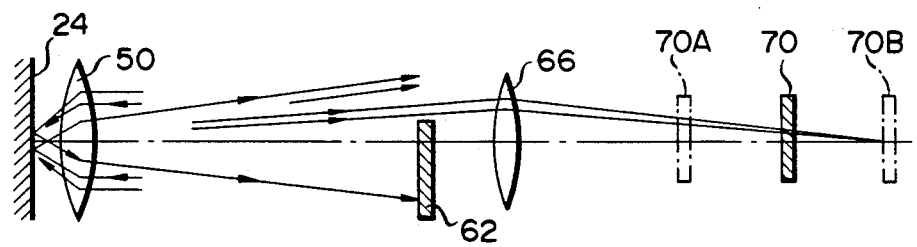
Figure 11C:
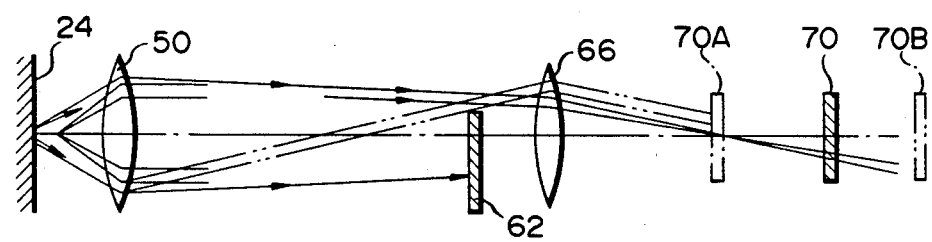

In the optical system shown in FIGS. 11A to 11C, the light rays emerging from the objective lens 50 and directed toward the projection lens 66 do not actually have a uniform intensity but has a Gauss distribution. Therefore, the light rays having a distribution as shown in FIG. 12 become incident on the light-receiving surfaces of the second photo detecting unit 70. Referring to FIG. 12, the path indicated by broken line I corresponds to a case wherein the light shielding plate 62 is not inserted in the path of light rays at all. The path indicated by solid line II corresponds to a case wherein the light shielding plate 62 is inserted in the optical path. In the just in-focusing state, the light-receiving surfaces of the second photo detecting unit 70 are positioned at a position X0. In the defocusing state, the light-receiving surfaces of the second photo detecting unit 70 are positioned at a position X1 or X2. It is seen from FIG. 12 that when slight defocusing occurs, the detection sensitivity of the second photo detecting unit 70 is lower than the estimated value. However, within the range between the positions X1 and X2, a projection position of light rays II only slightly changes, and a detection error is extremely small as compared to that obtained when the light-receiving surfaces of the second photo detecting unit 70 fall outside the range between the positions X1 and X2. Within this range, the diverging angle of the light rays I is also small as compared to the case wherein the light-receiving surfaces of the unit 70 do not fall within this range. As may be seen from the paths of the light rays I and II shown in FIG. 12, the pattern formed on the light-receiving surfaces of the photo detecting unit is deviated along the direction of insertion of the light shielding plate 62 in accordance with the defocusing amount δ, and extends in a direction perpendicular to this insertion direction.

The maximum deviation Δ of the position of the second photo detecting unit 70 from the focal point of the objective lens 50, which results in ideal optical behavior free from the influence of the wave optics will be considered. In general, the light intensity distribution at the convergent point is different depending upon the optical system used. However, a case of the optical system having a Gauss distribution will be considered. When the beam spot radius at the convergent point (beam waist) of the projection lens 66 is represented by $\omega_0$ and the wavelength of light is represented by λ, a beam spot diameter $\omega(Z)$ at a position at a distance Z from this focused point (beam waist) is given by:

$$\omega(Z) = \omega_O \sqrt{1 + (\lambda Z/\pi \omega_O^2)^2} \quad (29)$$

where Z is relatively large, an approximation:

$$\omega(Z) = \omega_O \sqrt{1 + (\lambda Z/\pi \omega_O^2)^2} \quad (35)$$
$$\approx \lambda Z/\pi \omega_O + (\tfrac{1}{2})(\pi \omega_O^3/\lambda Z)$$

can be obtained. The first term of this equation represents the geometrical/optical behavior, and the second term represents the spot extension due to the wave optics. Therefore, when the value of the first term is 4 times or more of that of the second term, substantially geometrical/optical behavior is obtained. As a condition for:

$$\lambda Z/\pi \omega_0 \geq 4 \times (\tfrac{1}{2})(\pi \omega_0^3/\lambda Z)$$

from $$Z^2 \geq 2(\pi \omega_0^2/\lambda)^2$$

we obtain:

$$Z \geq \sqrt{2} \times \pi \omega_O^2/\lambda \quad (36)$$

The maximum deviation Δ of the second photo detecting unit 70, therefore, is given by inequality (37) below:

$$|\pm \Delta| \leq \sqrt{2} \times \pi \omega_O^2/\lambda \quad (37)$$

The beam spot behavior on the photo detecting unit in the defocusing state will now be examined. Equations up to (22) are for a case wherein the second photo detecting unit 70 is arranged at the image forming plane on the light reflecting layer 24 of the optical disk 12. Similarly, equations for a case wherein the second photo detecting unit 70 is arranged at a position deviated from the image forming plane on the light reflecting layer 24 of the optical disk 12 will now be obtained. The overall optical system will be considered as a compound lens. In the just in-focusing state, that is, when the focal point of the objective lens 50 coincides with the light reflecting layer 24 of the optical disk 12, the distance A0 between the rear principal point of the compound lens and the focal point thereof is given from equation (14) by:

$$A0 = f^*(1 \pm m) \quad (38)$$

where m is the transverse multiplication factor and f is the focal lens of the compound lens. When the photo detecting unit is located at a position at a distance Δ toward the compound lens, the distance A between the rear principal point of the compound lens and the photo detecting unit 70 is given by:

$$A = A0 - \Delta \quad (39)$$
$$= f^*(1 \pm m) - \Delta$$

When equation (39) is substituted in equation (20), we have:

$$h2 = h^* - A\beta 2$$
$$= \beta 0\{\mp \Delta/m - (\mp m \mp \Delta/f^*) \cdot 2\delta\}$$

Substitution of equation (19) in this equation provides:

$$h2 = \{\mp \Delta/m - (\mp m + \Delta/f^*) \cdot 2\delta\} \cdot \{y/f0 + (-1 - a/f0)(2\delta + b)]\} \quad (40)$$

This equation (40) can be applied to a relatively wide range of optical systems for defocusing detection, and can be used as a general formula. When it is assumed that Δ=0 in equation (40), equation (20) is obtained.

The state close to the just in-focusing state will be considered. When the radius of the aperture of the objective lens 50, that is, the exit pupil is represented by y0, a is set to 0, and the distance F between the main principal point of the objective lens 50 closer to the optical disk 12, the convergent point (beam waist) is set to satisfy $F = f0 + b$ and $F + 2\delta \approx F(\delta << F)$, equation (40) above can be rewritten as:

$$h2 = \{\pm \Delta/m - (\mp m + \Delta/f^*) \times 2\delta\} \cdot y0/F\} \quad (41)$$

Since the maximum deviation Δ in equation (40) is not great, the inequality $\Delta << f^*$ is obtained. In addition, in order to improve defocusing detection sensitivity, the inequality $m >> 1$ is established. Therefore, equation (40) can be approximated as follows:

$$h2 \approx \{\mp \Delta/m \pm 2m\delta\} \times y/\{f0 + (1 - a/f0)(2\delta + b)\} \quad (42)$$

In the same manner as in equation (41), when $F = f0 + b$ and $F + 2\delta \approx F(\delta << F)$ are given in equation (42), we have:

$$h2 \approx \{\mp \Delta/m \pm 2m\delta\} \times y0/F \quad (43)$$

Equations (41), (42) and (43) indicate the distance between the edge of the beam spot pattern and the optical axis. Therefore, the width d of the photo insensitive region 71 is defined by an inequality obtained by substituting $\pm \delta c$ for δ in equation (43):

$$d \leq |h2(+\delta c)| + |h2(-\delta c)| = \quad (44)$$
$$|\{\mp \Delta/m \pm 2m\delta c\}(y0/F)| + |\{\mp \Delta/m \mp 2m\delta c\}(y0/F)|$$

wherein d is one of $|h2(+\delta c)|$ and $|h2(-\delta c)|$. When the width d is sufficiently smaller than twice the larger of these two value, equation (44) is satisfied. Therefore, the width d is defined as follows:

$$d \leq |2h2(+\delta c)| \text{ or } |2h2(-\delta c)| \quad (45)$$

The following can be seen from equation (41) or (42). When the photo detecting unit 70 comes closer to the projection lens 66 than the focal point thereof in the just in-focusing state (i.e., when $\Delta > 0$), $|h3|$ increases when the objective lens 50 is shifted toward the light reflecting layer 24 (i.e., when $\delta < 0$). However, $|h2|$ temporarily decreases and then monotonously increases when the objective lens 50 moves further away from the light reflecting layer 24 (i.e., when $\delta > 0$). The value of $|h2|$ increases at a higher rate when the objective lens 50 is moved from the layer 24($\delta > 0$) than that when the objective lens 50 is shifted toward the layer ($\delta > 0$). Therefore, the beam spot pattern on the photo detecting unit 70 falls partially outside the photo sensitive regions 78-1 and 78-2 of the photo detecting unit 70, so that the optical defocusing detection signal decreases. However, when the photo detecting unit 70 moves further away from the projection lens 66 than the focal point thereof (i.e., when $\Delta < 0$), the opposite effect is obtained. In particular, when the objective lens 50 comes closer to the reflection layer 24 (i.e., when $\delta < 0$), $|h2|$ temporarily decreases to zero and then greatly increases. Otherwise (i.e., when $\delta > 0$), $|h2|$ monotonously increases. Therefore, the beam spot pattern on the photo detecting unit 70 will not fall partially outside the photo sensitive regions 78-1 and 78-2 thereof when $\delta < 0$, in contrast with the case where $\delta > 0$. In other words, even if the objective lens 50 is greatly deviated from the just in-focusing position, a high-level defocusing signal is still obtained. When the objective lens 50 moves further away from the light reflecting layer 24 (i.e., when $\delta > 0$), the beam spot pattern on the photo detecting unit 70 quickly falls outside the photo sensitive regions 78-1 and 78-2 thereof, thereby easily performing automatic tracking of the optical head.

Figure 13:
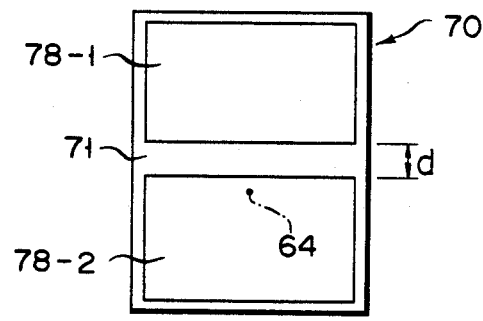
FIG. 13 is a plane view of the photo sensitive and photo insensitive regions of the photo detecting unit.

As described above, when $\Delta \neq 0$, and $|h2|$ changes by using $\delta$ as a variable, $|h2| = 0$ is established. When $|\delta 0|$ for $h2 = 0$ is smaller than $|\delta c|$, no problem occurs. However, when $|\delta 0|$ is greater than $|\delta c|$, and the photo detecting unit 70 is located such that the optical axis 64 passes through the photo insensitive region 71, this defocusing state given by $\delta c$ tends not to be detected. When the photo sensitive regions 78-1 and 78-2 of the photo detecting unit 70 are located to be shifted by $\pm \Delta$ from the back focal point of the objective lens 50, the photo detecting unit 70 must be located such that the optical axis 64 passes through one of the photo sensitive regions 78-1 and 78-2, as shown in FIG. 13. In this case, a distance Sd between the optical axis 64 and the center of the photo insensitive region 71 is set to be $\frac{1}{2}$ or less of the larger of $|h2(\Delta, \delta c)|$ and $|h2(\Delta, -\delta c)|$, that is:

$$Sd \leq |h2(\Delta, \delta c)|/2 \text{ or } |h2(\delta, -\delta c)|/2 \quad (46)$$

The allowable shift amount $\Delta$ of the photo detecting unit 70 will now be considered.

The allowable shift amount $\Delta$ of the photo detecting unit 70 will now be calculated. Here a condition $a = 0$ is considered. In other words, the path of the light rays at a distance y from the optical axis and at a distance a from the objective lens 50, and the state close to the just in-focusing state ($\delta = 0$) is only considered. Therefore, assuming $F = f0 + b$, equation (40) can be rewritten as:

$$h2 = \{\pm \Delta/m + (\mp m + \Delta/f^*) \cdot 2\delta\}\{y/(f0 + b)\} \quad (47)$$

-continued
$$= \{\pm \Delta/m + (\mp m + \Delta/f^*) \cdot 2\delta\}(y/F)$$

That is, with the defocusing amount $\delta$, the light rays are shifted on the unit 70 by a distance:

$$\{(\mp m + \Delta/f^*) \times 2y\delta\}/F$$

and the defocusing is detected. However, when the photo detecting unit is arranged at a position deviated from the image forming plane for the light reflecting layer 24 of the optical disk 12, the laser spot is shifted on the unit due to a vertical displacement of the optical disk 12 or the like. Then, even if the optical system is in the just in-focusing state, the defocusing state is erroneously detected. The displacement of the beam spot is thus calculated. The inclination angle of the light reflecting layer 24 of the optical disk 12 with respect to its horizontal state is represented by $\theta$. When the main light rays passing along the optical axis of the objective lens 50 are reflected by the optical disk 12 and reach the front principal plane of the objective lens 50, the shift or deviation $\eta$ of the beam spot in the just in-focusing state is given by:

$$\eta = 2\theta F$$

where F is the distance between the front principal point of the objective lens 50 and the image forming plane on the optical disk 12. When the radius of the exit pupil or aperture of the objective lens 50 is represented by r, a ratio $\rho$ of the beam shift on the objective lens 50 is given by:

$$\rho = \eta/r = 2\theta F/r$$

From the geometric/optical characteristics, the deviation $\xi$ of the main light rays on the photo detecting unit 70 is given from equation (47) as:

$$\xi = \pm \Delta r/mF \times \rho = \pm 2\theta \Delta/m \quad (48)$$

The allowance of the defocusing amount $\delta c$ when the optical disk 12 is inclined will now be considered. The shift amount Hc of the outermost periphery of the photo detecting unit 70 is given by:

$$Hc = 2r\delta c \times (\mp m + \Delta/f^*)/F \quad (49)$$

A comparison of equations (48) and (49) reveals that the deviation $\xi$ of the spot on the photo detecting unit 70 which is given by equation (49) indicates a value when the aperture of the objective lens 50 is infinitely large. However, in practice, light reflected by the light reflecting layer 24 of the optical disk 12 is limited by a finite size of the aperture or the pupil of the objective lens 50. The light rays are further limited by the knife edge, prism, mirror and the like. For this reason, the spot itself on the photo detecting unit 70 is not moved very much but the intensity distribution within the spot changes. Equation (49) provides a change in the outermost position of the spot on the photo detecting unit 70 in the defocusing state. However, when the overall shift of the spot on the photo detecting unit 70 in the defocusing state is considered, the positions of ends of the knife edge, prism, mirror and the like must also be considered. Thus, the overall shift of the spot cannot be obtained with only equations (48) and (49). However, an approximate estimation can be provided.

For the inclination angle $\theta$ of the optical disk 12 with respect to its horizontal state, the optical system operates stably without a significant defocusing within the shift range of:

$$|\xi(\theta,\Delta)| < |Hc|$$

When it is assumed that $m << \Delta/f^*$ in equation (49) and when calculations are performed neglecting the inclination, defocusing or the deviation direction of the unit 70 from the image forming plane and assuming that $\theta > 0$, $\delta c > 0$ and $\Delta > 0$, we have, from equations (48) and (49):

$$2\theta\Delta/m \leq 2r\delta c \times (\mp m + \Delta/f^*)/F \quad (50)$$

A maximum allowable value $\theta$max of the angle $\theta$ in the system in accordance with the DAD standards is given to be:

$$\theta\text{max} = 1° = \pi/180 \text{ (radian)}$$

When this value is substituted in equation (49), $$(\theta\text{max}/m \pm r\delta c/f^*F)\Delta \leq rm\delta c/F$$

and the allowable shift amount $\Delta$ of the photo detecting unit 70 is calculated to be:

$$\Delta \leq rm\delta c \times (F\theta\text{max}/m - y\delta c/f^*)^{-1}$$

When it is assumed that $m << \Delta/f^*$ and the term $\Delta/f^*$ is eliminated, equation (50) can be rewritten as:

$$2\Delta\theta\text{max}/m \leq 2r\delta c \times m/F$$

and $$\Delta \leq rm^2\delta c/F\theta\text{max}$$

According to the present invention as described above, the width of the photo insensitive region 71 falls within the predetermined range so as to cause the photo detector to stably detect the defocusing state with sufficient sensitivity.

What is claimed is:
1. An optical head for focusing a light beam on a light-reflecting surface, comprising:
   means for generating a light beam;
   means for transferring the light beam;
   objective lens means for converting the transferred light beam into a convergent light beam with a beam waist, projecting the light beam on the light-reflecting surface and converging the light beam reflected from the light-reflecting surface, said objective lens means having a convergent point and an inherent maximum defocusing allowance of $\pm \delta c$ with reference to said convergent point;
   means for deflecting the light beam from the objective lens means, depending on the distance between the objective lens means and the light-reflecting surface;
   converging means, having a converging point, for converging the light beam from the deflecting means into the convergent point of the converging means in a focusing state; and
   photodetector having first and second photo sensitive regions and a photo insensitive region defined therebetween, said photodetector being disposed to cause a part of a beam spot to be formed on one of the photosensitive regions by the light beam projected on the photodetector when the objective lens is defocused on the photodetector when the objective lens is over the maximum defocusing allowance $\pm \delta c$.

2. An optical disk according to claim 1, wherein said photo insensitive region has a width d which is not more than twice the larger of absolute values $|h3(\Delta, \delta c)|$ and $|h3(\Delta, -\delta c)|$ of variables given as follows:

$$h3(\Delta, \delta c) = \{\mp \Delta/m + 2m\delta c\}(y0/F)$$

$$h3(\Delta, -\delta c) = \{\mp \Delta/m - 2m\delta c\}(y0/F)$$

where $\Delta$ is a distance between a convergent point of said converging means and the regions of said photodetector, a direction toward said converging means is given to be negative and an opposite direction is given to be positive, m is a magnification of the beam spot formed on the regions of the photodetector, y0 is a radius of an exit pupil of the objective lens, and F is a distance between a principal point of the objective lens means and the convergent point of the objective lens means.

3. An optical head according to claim 2, wherein the regions of said photodetector are located at the convergent point of said converging means, and the photo insensitive region thereof has the width d given below:

$$d \leq 4my0\delta c/F.$$

4. An optical head according to claim 2, wherein the regions of said photodetector are located to be deviated by $\Delta(\Delta \neq 0)$ from the convergent point of said converging means, the first and second photo sensitive regions being arranged such that an optical axis of said converging means passes through one of the first and second photo sensitive regions.

5. An optical head according to claim 4, wherein a distance Sd between the optical axis and the photo insensitive region is not more than ½ of the larger of $|h3(\Delta, +\delta c)|$ and $|h3(\Delta, -\delta c)|$.

6. An optical head according to claim 3, wherein said converging means has an optical axis passing through the convergent point of said converging means and the photo insensitive region of said photodetector.

7. An optical head according to claim 1, wherein the maximum defocusing allowance $\delta c$ is given as follows:

$$\delta c = \mp \lambda/2[NA]^2$$

where NA is the numerical aperture of the objective lens means and $\lambda$ is the wavelength of the light beam.

8. An optical head according to claim 1, wherein said converging means has an optical axis passing through the convergent point of said converging means and the beam deflecting means includes a light-shielding plate which transmit only part of the light beam passing through the region apart from the optical axis.

* * * * *